United States Patent
Kaneko

(10) Patent No.: US 11,457,155 B2
(45) Date of Patent: Sep. 27, 2022

(54) APPARATUS, METHOD FOR CONTROLLING, AND MEDIUM

(71) Applicant: CANON KABUSHIKI KAISHA, Tokyo (JP)

(72) Inventor: Seigo Kaneko, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/983,304

(22) Filed: Aug. 3, 2020

(65) Prior Publication Data
US 2021/0044736 A1  Feb. 11, 2021

(30) Foreign Application Priority Data

Aug. 8, 2019  (JP) .............................. JP2019-145945

(51) Int. Cl.
| | |
|---|---|
| *H04N 5/235* | (2006.01) |
| *G06T 5/00* | (2006.01) |
| *G06T 5/50* | (2006.01) |
| *G06T 11/00* | (2006.01) |
| *H04N 1/387* | (2006.01) |
| *H04N 5/33* | (2006.01) |
| *H04N 9/04* | (2006.01) |

(52) U.S. Cl.
CPC ......... *H04N 5/2354* (2013.01); *H04N 5/2351* (2013.01); *H04N 5/2353* (2013.01)

(58) Field of Classification Search
CPC .. H04N 5/2354; H04N 5/2351; H04N 5/2353; G06T 2207/20221
See application file for complete search history.

(56) References Cited

U.S. PATENT DOCUMENTS

| | | | |
|---|---|---|---|
| 2018/0146144 A1* | 5/2018 | Sugiyama | ............ H04N 5/2354 |
| 2019/0385291 A1* | 12/2019 | Tanaka | ................. G06K 9/6201 |

FOREIGN PATENT DOCUMENTS

JP   2011-239259 A   11/2011

* cited by examiner

*Primary Examiner* — Christopher K Peterson
(74) *Attorney, Agent, or Firm* — Canon U.S.A., Inc. IP Division

(57) ABSTRACT

There is provided with an image processing apparatus. An acquisition unit acquires a first image captured with visible light and a second image captured with non-visible light. A correction unit corrects luminance of the second image so as to bring luminance distribution of the second image close to luminance distribution of the first image. A generation unit combines the second image whose luminance is corrected by the correction unit and chromaticity information of the first image to generate a composite image.

21 Claims, 16 Drawing Sheets

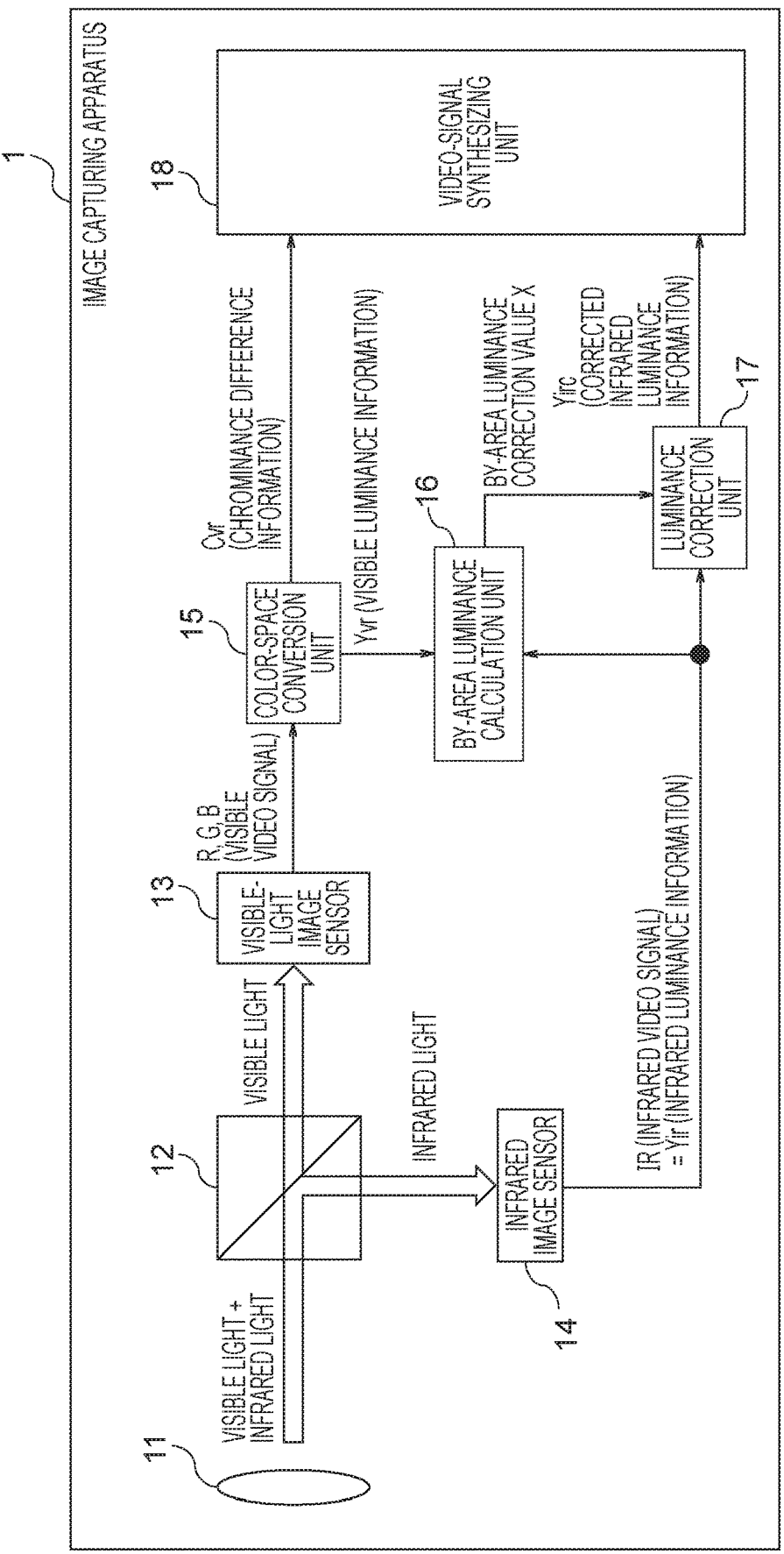

APPARATUS, METHOD FOR CONTROLLING, AND MEDIUM

BACKGROUND

Field of the Disclosure

The present disclosure relates to an apparatus for image processing capable of combining a plurality of captured images with different wavelength bands, as well as a method of controlling that and a medium.

Description of the Related Art

Japanese Patent Laid-Open No. 2011-239259 discloses an image processing apparatus configured to combine color image data including only wavelength components in a visible light band and monochrome image data including no wavelength components in a visible light band but including only wavelength components outside the visible light band to generate composite image data.

Specifically, the image processing apparatus disclosed in Japanese Patent Laid-Open No. 2011-239259 generates composite image data by extracting chromaticity information from color image data, extracting luminance information from monochrome image data, and combining the chromaticity information of the color image data and the luminance information of the monochrome image data.

However, the color image data and the monochrome image data to be combined have different wavelength bands of light to be imaged. This can cause a difference in luminance information between the color image data and the monochrome image data because of the spectral characteristics of illumination, reflectance of the object, and so on. For example, an area that is captured brightly in a color image is captured darkly in a monochrome image, resulting in a phenomenon in which luminance information on the area differs between the color image and the monochrome image.

In the composite image that the image processing apparatus disclosed in Japanese Patent Laid-Open No. 2011-239259 generates, the luminance information of the monochrome image data having the wavelength components outside the visible light band is combined with the chromaticity information of the color image data, as described above. This may cause in the composite image an area having luminance information different from the luminance information of the color image.

Since the composite image includes an area having luminance information different from the luminance information on the color image as described above, an image is composed with a region having the luminance information different from the luminance information of the color image, which is a visible image close to a human visual perception spectrum. This can reduce color reproducibility in the composite image, providing a feeling of strangeness to a user who is viewing the composite image.

SUMMARY

According to an embodiment of the present disclosure, an apparatus comprises: an acquisition unit configured to acquire a first image captured with visible light and a second image captured with non-visible light; a correction unit configured to correct luminance of the second image so as to bring luminance distribution of the second image close to luminance distribution of the first image; and a generation unit configured to combine the second image whose luminance is corrected by the correction unit and chromaticity information of the first image to generate a composite image.

According to another embodiment of the present disclosure, a method for controlling an apparatus comprises: acquiring a first image captured with visible light and a second image captured with non-visible light; correcting luminance of the second image so as to bring luminance distribution of the second image close to luminance distribution of the first image; and combining the second image whose luminance is corrected and chromaticity information of the first image to generate a composite image.

According to still another embodiment of the present disclosure, a non-transitory computer-readable medium stores a program for causing a computer to execute a method of an apparatus comprising: acquiring a first image captured with visible light and a second image captured with non-visible light; correcting luminance of the second image so as to bring luminance distribution of the second image close to luminance distribution of the first image; and combining the second image whose luminance is corrected and chromaticity information of the first image to generate a composite image.

Further features of the present disclosure will become apparent from the following description of exemplary embodiments with reference to the attached drawings.

BRIEF DESCRIPTION OF THE DRAWINGS

FIG. 1 is a diagram illustrating an example of the hardware and the functional configuration of an image capturing apparatus according to a first embodiment.

DESCRIPTION OF THE EMBODIMENTS

Figure 2A:
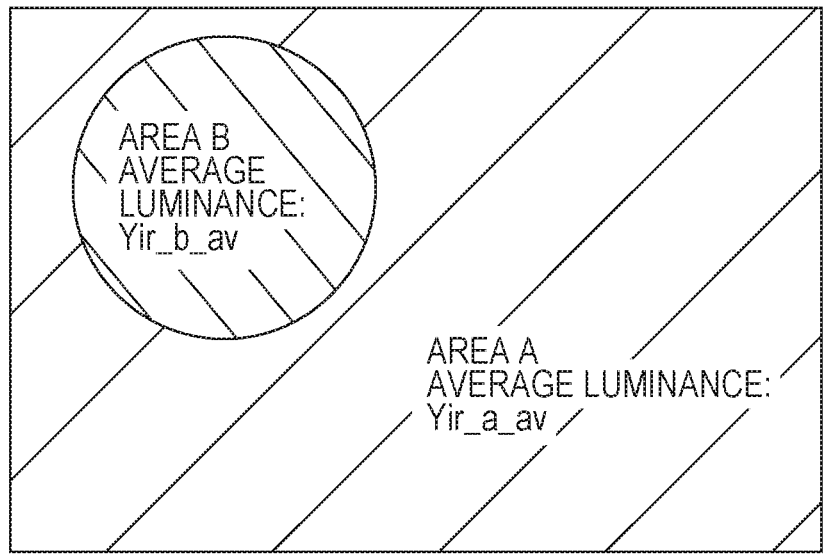
FIG. 2A is a diagram illustrating an example of the luminance of an infrared image.

Embodiments of the present disclosure will be described in detail hereinbelow with reference to the accompanying drawings. It is to be understood that the following embodiments are given for illustrative purposes, should be appropriately modified or changed according to the configuration of the device to which the present disclosure is applied and various conditions, and are not intended to limit the present disclosure. It is also to be understood that not all of the combinations described in the embodiments are necessary for the present disclosure.

An example in which the image processing apparatus according to the embodiments is installed in an image capturing apparatus will be described hereinbelow. However, the present disclosure is not limited to the embodiments. For example, the image processing apparatus may generate a composite image by obtaining images captured by one or more image capturing apparatuses.

An example will be described in which an image capturing apparatus having an image processing function generates a composite image by combining color image data captured with visible light (hereinafter also referred to as "visible image") and monochrome image data captured with infrared light (hereinafter also referred to as "infrared image"). However, there is no particular limitation on the wavelength band and the band width of the captured image in the present embodiment.

First Embodiment

Hardware and Functional Configuration of Present Embodiment

FIG. 1 is a diagram illustrating an example of the hardware and the functional configuration of an image capturing apparatus according to the present embodiment.

The image capturing apparatus 1 illustrated in FIG. 1 is capable of capturing an image in at least two different wavelength bands. In the following description, a first wavelength band is a visible light band, and a second wavelength band is an infrared light band.

The image capturing apparatus 1 in FIG. 1 includes a lens 11, a beam splitter 12, a visible-light image sensor 13, an infrared image sensor 14, a color-space conversion unit 15, a by-area luminance calculation unit 16, a luminance correction unit 17, and a video-signal synthesizing unit 18.

The lens 11 allows outside light including visible light and infrared light to pass through into the image sensors 13 and 14 at the subsequent stage through the beam splitter 12.

The beam splitter 12 separates the visible light and the infrared light from each other by allowing the visible light to pass through and reflecting the infrared light in the vertical direction to make the visible light incident on the visible-light image sensor 13 and the infrared light incident on the infrared image sensor 14.

The visible light image sensor 13 has sensitivity to visible light components (wavelengths from 400 nm to 750 nm), and the infrared image sensor 14 has sensitivity to infrared light components (wavelengths from wavelength 750 nm to 1,000 nm). Video signal processing on the visible light components and the infrared light components will be individually described hereinbelow.

The visible light image sensor 13 includes red (R), green (G), and blue (B) color filters. The visible light image sensor 13 allows visible light that has passed through the beam splitter 12 to pass through the color filters to output visible video signals of the wavelength components (R, G, and B).

The color-space conversion unit 15 executes color-space conversion processing for converting the visible light signals coming from the visible light image sensor 13 to luminance information on the visible light (hereinafter referred to as "visible luminance information") Yvr and chrominance difference information Cvr. The color-space conversion unit 15 supplies the visible luminance information Yvr to the by-area luminance calculation unit 16 and supplies the chrominance difference information Cvr to the video-signal synthesizing unit 18.

The by-area luminance calculation unit 16 calculates a correction value X for correcting luminance information on the infrared light (hereinafter referred to as "infrared luminance information") Yir supplied from the infrared image sensor 14 for each area of the image on the basis of the visible luminance information Yvr supplied from the color-space conversion unit 15. The calculated correction value X is supplied to the luminance correction unit 17.

The luminance correction unit 17 corrects the infrared luminance information Yir supplied from the infrared image sensor 14 on the basis of the luminance correction value X for each area supplied from the by-area luminance calculation unit 16 and supplies the corrected infrared luminance information Yirc to the video-signal synthesizing unit 18.

The video-signal synthesizing unit 18 combines the chrominance difference information Cvr supplied from the color-space conversion unit 15 and the corrected infrared luminance information Yirc supplied from the luminance correction unit 17 to output a composite image. The details of the processing for correcting the luminance information on the infrared light (infrared image) will be described with reference to FIGS. 2A and 2B to FIG. 4.

Since the infrared image sensor 14 does not need to obtain chrominance difference information, the infrared image sensor 14 may not include color filters. For that reason, an example will be described here in which the infrared image sensor 14 includes no color filter, and there is no difference in spectral characteristics between adjacent pixels.

The infrared image sensor 14 receives infrared light reflected by the beam splitter 12 and outputs an infrared video signal IR. The infrared video signal IR output here has luminance information but no chrominance difference information and is therefore output as the infrared luminance information Yir.

The infrared image sensor 14 supplies the infrared luminance information Yir to the by-area luminance calculation unit 16 and the luminance correction unit 17.

The luminance correction unit 17 corrects the infrared luminance information Yir for each area of the image on the basis of the by-area luminance correction value X calculated by the by-area luminance calculation unit 16 and supplies the corrected infrared luminance information Yirc to the video-signal synthesizing unit 18.

The video-signal synthesizing unit 18 combines the chrominance difference information Cvr supplied from the color-space conversion unit 15 and the corrected infrared luminance information Yirc supplied from the luminance correction unit 17 to generate a composite image.

The functional units of the color-space conversion unit 15, the by-area luminance calculation unit 16, the luminance correction unit 17, and the video-signal synthesizing unit 18 illustrated in FIG. 1 are implemented by one or more central processing units (CPUs) executing programs stored in a storage unit. In other words, the flowcharts described below are implemented by one or more CPUs executing the programs stored in the storage unit and executing calculation and processing of information and control of each hardware. Alternatively, part of all of the functional units illustrated in FIG. 1 may be implemented by dedicated hardware.

FIG. 1 illustrates an example in which visible light and infrared light are separated from each other by the beam splitter 12 to obtain a visible image and an infrared image. However, the optical element that separates visible light and infrared light in the present embodiment is not limited to the beam splitter 12. For example, the beam splitter 12 may be replaced with, for example, a dichroic mirror or a dichroic prism.

The image capturing apparatus 1 may include a single image sensor having sensitivity to both of the visible light band and the infrared light band, in place of the visible-light image sensor 13 and the infrared-light image sensor 14. The light from the lens 11 may be introduced to the single image sensor, and the visible image and the infrared image may be separated on the light receiving surface of the image sensor according to the transmission characteristic of a filter disposed in front of the image sensor. Alternatively, a band pass filter, a short pass filter, a long pass filter, or the like may be detachably placed on the optical path to separate the visible image and the infrared image. In this case, the beam splitter 12 is not needed.

Such an image sensor uses three-color and infrared color filters with an RGB IR Bayer arrangement in place of the three-color separation color filters with an RGB Bayer arrangement. Here, IR refers to a color filter having sensitivity to infrared light.

Thus, even a single image sensor can obtain a visible video signal from RGB and an infrared video signal from IR by using a color filter with an RGB IR Bayer arrangement.

The above illustrates an example in which the infrared image sensor 14 of the image capturing apparatus 1 does not use a color filter. However, the present embodiment is not limited to the above example.

Since the infrared image sensor 14 may have sensitivity only to infrared light, the infrared image sensor 14 may use RGB color filters having sensitivity not only to the visible light band but also to the infrared light band.

The above illustrates an example in which a visible image and an infrared image are combined. The image to be combined with the visible image is not limited to the infrared image. Modifications may be made. For example, the image sensors in FIG. 1 may have sensitivity to another non-visible light band (for example, an ultraviolet range) or a narrow band within a visible light band. Thus, modifications may be made without being limited by the classification of the wavelength band or the bandwidth of the wavelength band.

By-Area Luminance Correction

Referring to FIGS. 2A and 2B to FIG. 4, the details of luminance correction processing for each area of an image performed by the by-area luminance calculation unit 16 and the luminance correction unit 17 of the image capturing apparatus 1 according to the present embodiment will be described.

Figure 2B:
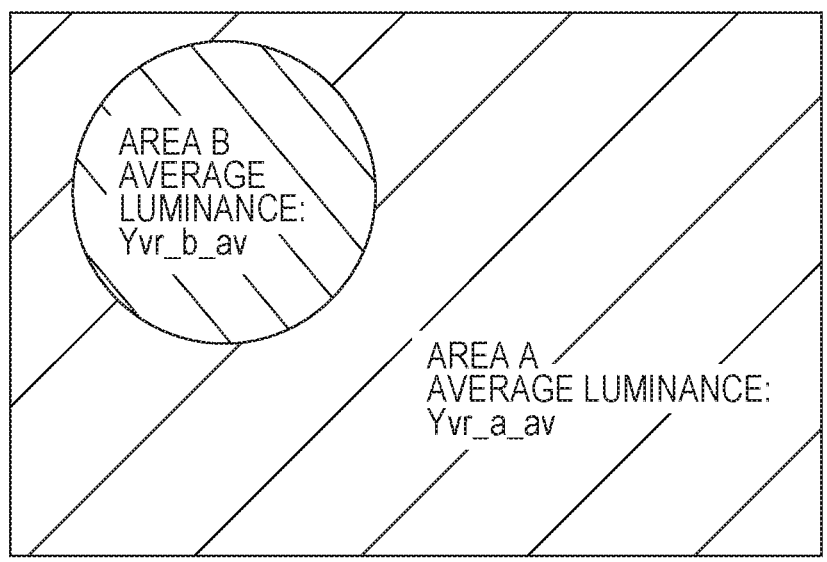
FIG. 2B is a diagram illustrating an example of the luminance of a visible image.

FIG. 2A illustrates an example of an infrared image generated according to the infrared luminance information Yir, and FIG. 2B illustrates an example of a visible image generated according to the visible luminance information Yvr.

The images in FIG. 2A and FIG. 2B are captured at the same angle of view, in which area A and area B are within the angle of view of the image capturing apparatus 1.

In FIG. 2A, Yir_a_av is the average luminance of area A of the infrared image, and Yir_b_av is the average luminance of area B of the infrared image. In FIG. 2B, Yvr_a_av is the average luminance of area A of the visible image, and Yvr_b_av is the average luminance of area B of the visible image.

Here, the average luminance values (Yir_a_av, Yir_b_av, Yvr_a_av, and Yvr_b_av) of the areas differ from one another for the sake of simplicity. The difference in luminance between area A and area B in each of the infrared image in FIG. 2A and the visible image in FIG. 2B differ between the infrared image in FIG. 2A and the visible image in FIG. 2B. One of the main causes of the difference in luminance information between the wavelength bands of the image capturing light is the spectral reflectance characteristics (wavelength dependency) of the object.

However, the average luminance values of all the areas may not necessarily differ between the infrared image in FIG. 2A and the visible image in FIG. 2B. There may be an area whose average luminance values are the same.

Figure 3A:
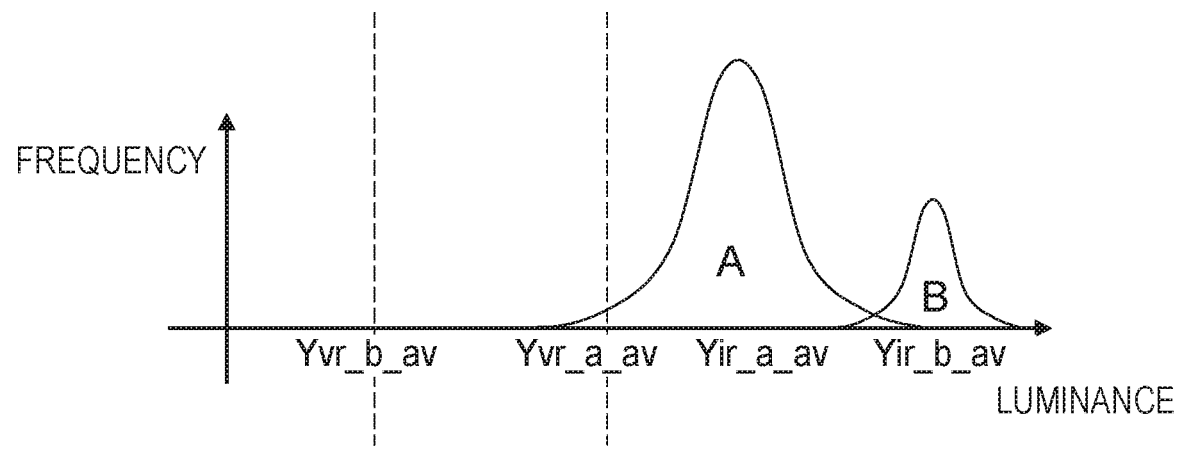
FIG. 3A illustrates an example of the histogram of the luminance of the infrared image in FIG. 2A.
Figure 3B:
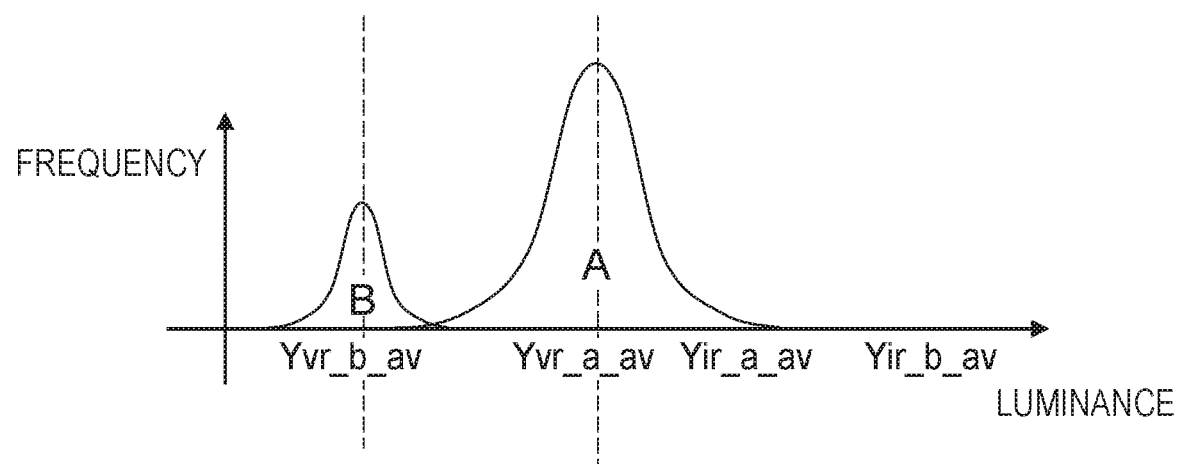
FIG. 3B illustrates an example of the histogram of the luminance of the visible image in FIG. 2B.

FIGS. 3A and 3B illustrate histograms of images in FIGS. 2A and 2B converted for each area to facilitate visual understanding. FIG. 3A illustrates a histogram of the luminance information on the infrared image in FIG. 2A, and FIG. 3B illustrates a histogram of luminance information on the visible image in FIG. 2B.

In the present embodiment, the average luminance values (Yir_a_av and Yir_b_av) of the areas of the infrared image illustrated in FIG. 3A will be conform to the average luminance values (Yvr_a_av and Yvr_b_av) of the areas of the visible image illustrated in FIG. 3B. This allows, in the present embodiment, the luminance of each area of the composite image synthesized based on the luminance information on the infrared image to come close to the visible image.

By-Area Luminance Correction and Image Synthesis Processing

Figure 4:
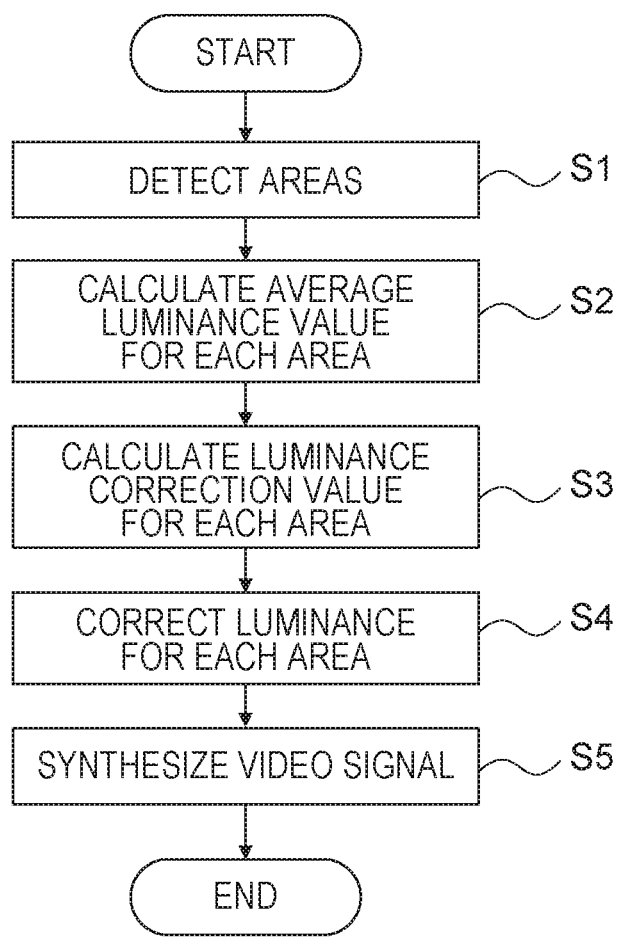
FIG. 4 is a flowchart illustrating an example of the procedure of by-area luminance correction and image synthesis processing that the image capturing apparatus according to the first embodiment executes.

FIG. 4 is a flowchart illustrating an example of the procedure of the by-area luminance correction and image synthesis processing that the image capturing apparatus 1 according to the present embodiment executes.

The steps in FIG. 4 are implemented by the CPU reading and executing the program stored in the storage unit of the image capturing apparatus 1. At least part of the flowchart in FIG. 1 may be implemented by hardware. For implementing with hardware, a dedicated circuit may be automatically generated on a field programmable gate array (FPGA) from the program for implementing the steps. A Gate Array circuit may be formed, like the FPGA, and may be implemented as hardware. The steps may be implemented by an application specific integrated circuit (ASIC).

In step S1, the by-area luminance calculation unit 16 of the image capturing apparatus 1 detects areas in the captured image.

In the present embodiment, the by-area luminance calculation unit 16 of the image capturing apparatus 1 detects areas from the image on the basis of the visible luminance information Yvr output from the color-space conversion unit 15. Specifically, the by-area luminance calculation unit 16 segments the area of the image by detecting a large luminance difference (edge) from the luminance information on each pixel of the image. Thus, area A and area B having a luminance difference between the visible image and the infrared image and having different average luminance values can be detected as illustrated in FIGS. 2A and 2B and FIGS. 3A and 3B.

In step S2, the by-area luminance calculation unit 16 of the image capturing apparatus 1 calculates luminance for each area of the image detected in step S1. Specifically, the by-area luminance calculation unit 16 calculates the average luminance values of the individual areas (Yir_a_av, Yir_b_av, Yvr_a_av, and Yvr_b_av) from the visible luminance information Yvr and the infrared luminance information Yir. Here, each of the lower limit and the upper limit of the luminance is assumed to be the same between the infrared image and the visible image for ease of explanation.

However, each of the lower limit and the upper limit of the luminance may not be the same between the infrared image and the visible image. In this case, the luminance width from the lower limit to the upper limit may be made equal between the infrared image and the visible image by digital gain processing.

In step S3, the by-area luminance calculation unit 16 of the image capturing apparatus 1 calculates a luminance correction value for each area detected in step S1. Specifically, the by-area luminance calculation unit 16 calculates a luminance correction value X for each area on the basis of the average luminance by area calculated in step S2.

The luminance correction value X can be calculated from the ratio of the average luminance of the infrared image to the average luminance of the visible image. Since the luminance correction value differs between the areas, a luminance correction value Xa for area A is expressed as Eq. 1, and a luminance correction value Xb for area B is expressed as Eq. 2.

$$Xa = Yvr\_a\_av / Yir\_a\_av \quad \text{(Eq. 1)}$$

$$Xb = Yvr\_b\_av / Yir\_b\_av \quad \text{(Eq. 2)}$$

In step S4, the luminance correction unit 17 of the image capturing apparatus 1 applies luminance correction to the infrared luminance information Yir output from the infrared image sensor 14. Specifically, the luminance correction unit 17 multiplies the infrared luminance information Yir by the luminance correction value X for each area calculated by the by-area luminance calculation unit 16.

Here, the luminance correction value X differs between the areas, and the infrared luminance information Yir differs among the pixels. The luminance-corrected infrared luminance information Yirc on area A and area B is expressed as Eq. 3 and Eq. 4, respectively. As expressed in Eq. 1 and Eq. 2, the luminance correction value for area A is Xa, and the luminance correction value for area B is Xb. Eq. 3 expresses infrared luminance information Yirc_a on area A after the luminance is corrected, and Eq. 4 expresses infrared luminance information Yirc_b on area B after the luminance is corrected.

$$Yirc\_a = Yir * Xa \quad \text{(Eq. 3)}$$

$$Yirc\_b = Yir * Xb \quad \text{(Eq. 4)}$$

By applying luminance correction to the infrared luminance information Yir on the basis of the by-area luminance correction value X, the average luminance of the infrared image of each area can be made equal to the average luminance of the visible image. Not the correction value by area but a correction value by pixel or pixel block may be obtained.

In the present embodiment, by combining the corrected infrared luminance information Yirc and the chrominance difference information Cvr on the visible image, a color composite image with high color reproducibility in which the average luminance by area agrees with the average luminance of the visible image can be obtained while using the infrared luminance information as a base.

Although the above is an example in which a visible image and an infrared image are combined, the image to be combined with the visible image is not limited to the infrared image. For example, the image to be combined with the visible image may be an image captured in an ultraviolet light area or an image captured in a narrow band area in the visible light band. In this case, the image capturing apparatus 1 may include an image sensor that has sensitivity to light in a wavelength band.

Although, in step S1 of FIG. 4, areas of the image are detected by detecting the outline (edge) based on the difference in luminance levels on the basis of the luminance information, this is given for mere illustrative purposes.

For example, areas with different luminance on the histogram of luminance information may be detected. Alternatively, a moving object whose luminance differs may be detected and may be isolated. Alternatively, if the area to which luminance correction is to be applied is known, the user may specify the area.

Alternatively, image recognition may be used to extract the areas. For example, a specific area and the other area, for example, a face and the other area, may be detected as different areas using face recognition.

In the above description, the areas are detected from the luminance value of the visible image. Instead, the areas may be detected from the luminance value of the infrared image or from the luminance values of two images, the visible image and the infrared image.

Although FIGS. 2A and 2B, FIGS. 3A and 3B, FIG. 5, and FIG. 6 illustrate examples of two areas, the present embodiment can also be applied to the case of three or more areas. The minimum size of the areas may be freely set by the designer or the user. In this case, the minimum size may be specified using the number of pixels, such as horizontal 50 pixels×vertical 50 pixels.

Figure 5:
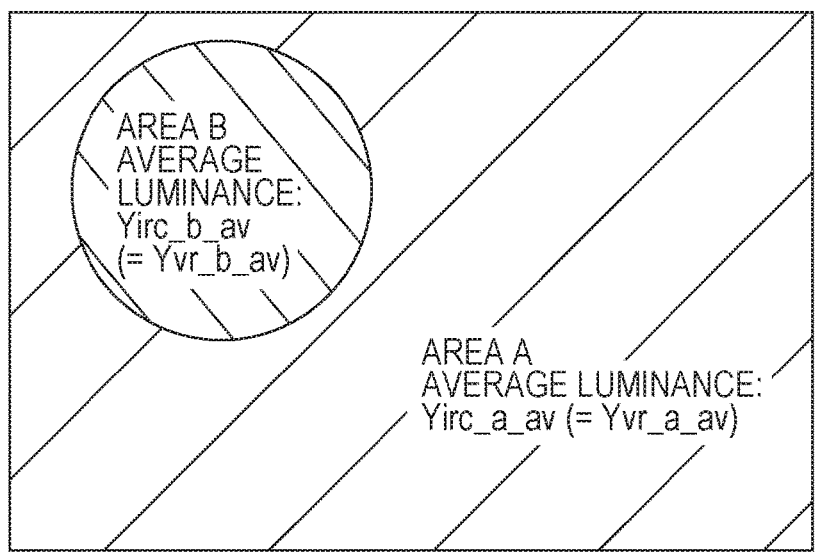
FIG. 5 is a diagram illustrating an example of the luminance of an infrared image after being subjected to luminance correction in the first embodiment.

FIG. 5 illustrates an example in which the luminance-corrected infrared luminance information Yirc is imaged.

Figure 6:
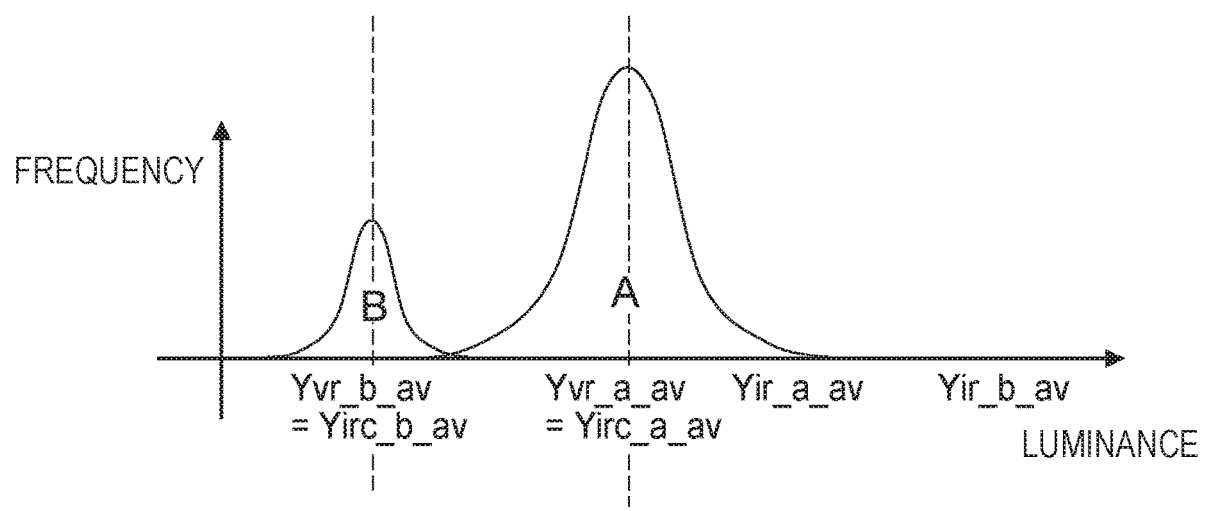
FIG. 6 is a diagram illustrating an example of the histogram of the luminance of the luminance-corrected infrared image in FIG. 5.

FIG. 6 illustrates an example of the histogram of the luminance-corrected infrared luminance information Yirc in FIG. 5. In FIGS. 5 and 6, Yirc_a_av is the average luminance of the luminance-corrected infrared luminance information on area A, and Yirc_b_av is the average luminance of the luminance-corrected infrared luminance information on area B.

The by-area average luminance values Yirc_a_av and Yirc_b_av illustrated in FIGS. 5 and 6 respectively agree with the by-area average luminance values Yvr_a_av and Yvr_b_av of the visible image in FIG. 2B and FIG. 3B from the results of calculation of Eq. 1 to Eq. 4. This shows that, from the viewpoint of average luminance by area, the luminance information Yir_a_av and Yir_b_av of the infrared image illustrated in FIG. 2A and FIG. 3A come close to (agree with, in FIGS. 5 and 6) the luminance information Yvr_a_av and Yvr_b_av of the visible image.

In the above example, luminance correction values are calculated for all the areas of the infrared image, and luminance correction is applied to the areas. However, this is given for illustration only and is not intended to limit the present disclosure. For example, if the number of areas detected from the image in step S1 of FIG. 4 is large, areas to which luminance correction is to be applied may be selected to reduce the load of luminance correction processing. In this case, small areas may not be subjected to luminance correction.

In the above description, the criterion for luminance correction of areas of the image is the average value of the luminance of the pixels in the areas. However, this is given for illustration and is not intended to limit the present disclosure. For example, the intermediate value between the minimum value and the maximum value of the luminance in the areas of the image or the value with the maximum frequency in the luminance histogram may be used as the criterion.

Since a composite image synthesized by the video-signal synthesizing unit 18 is composed of a visible image and an infrared image, the composite image is visually recognized as an image close to the visible image. For this reason, specific data may be embedded in or associated with the composite image data to enable the user to recognize that the image is a composite image. The specific data embedded in the composite image data may be, for example, a character string, such as "composite image", or a numeral, such as "01", that the user can visually recognize on the image, or alternatively, may be encoded and embedded in the data so as not to be visually recognized on the image.

As described above, the image capturing apparatus according to the present embodiment corrects luminance information on the infrared image on the basis of the luminance information on the visible image for each area of the captured image. The image capturing apparatus combines the luminance information on the infrared image corrected on the basis of the luminance information on the visible image and the chrominance difference information on the visible image to generate a composite image.

This reduces the luminance difference of each area between the infrared image and the visible image, allowing the luminance distribution of the composite image to be close to the luminance distribution of the visible image. This increases the color reproducibility in the composite image, reducing a feeling of strangeness that the composite image gives the user.

Furthermore, the use of the luminance information on the infrared image allows the high signal/noise (S/N) ratio of the infrared image to be maintained. The application of the same luminance correction to the areas of the infrared image prevents losing the gradation of the areas of the infrared image, maintaining high resolution.

Second Embodiment

Figure 7:
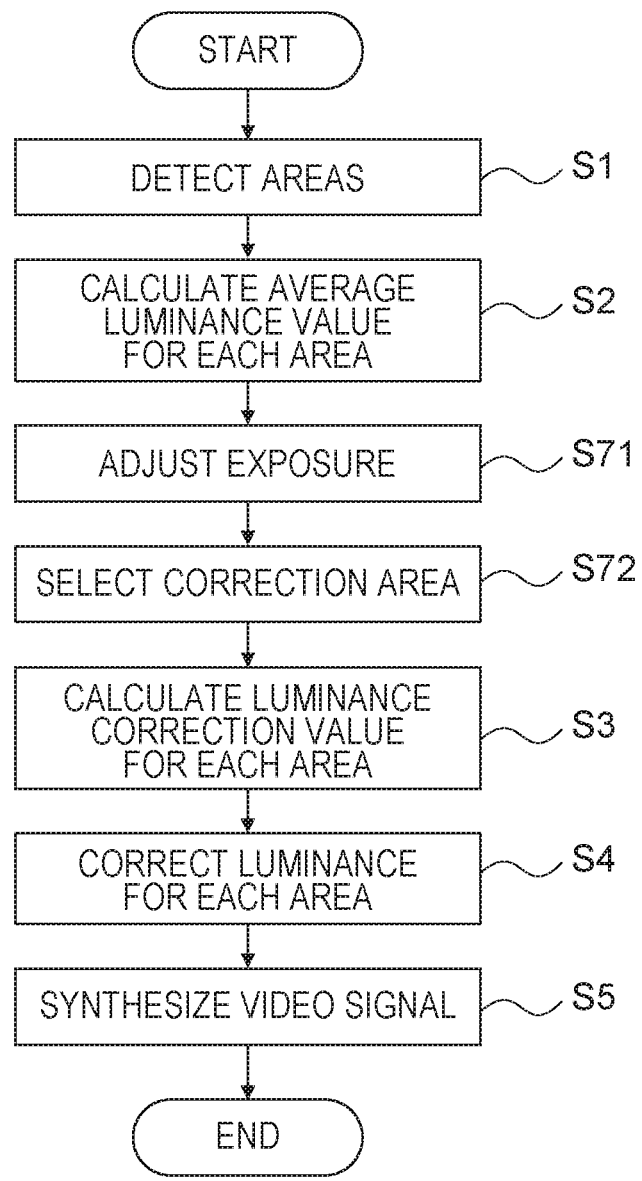
FIG. 7 is a flowchart illustrating an example of the procedure of by-area luminance correction and image synthesis processing that an image capturing apparatus according to a second embodiment executes.

Referring to FIG. 7, a second embodiment will be described in detail only with respect to differences from the first embodiment.

In the first embodiment, the image capturing apparatus 1 divides an image into areas and corrects the luminance so that the average luminance of each area of the infrared image comes close to the average luminance of the visible image. In contrast, in the present embodiment, the image capturing apparatus 1 executes exposure adjustment between the infrared image and the visible image before applying luminance correction and selects an area whose luminance is to be corrected when detecting the areas of the image.

Application of luminance correction to each area of the image can increase the processing load of the luminance correction. For this reason, the present embodiment compares the infrared image and the visible image to each other and applies luminance correction only to an area having large luminance difference. To directly compare the luminance values of the infrared image and the visible image, the present embodiment executes exposure adjustment between the infrared image and the visible image before applying the luminance correction.

Since the hardware and the functional configuration of the image capturing apparatus 1 according to the second embodiment are the same as those of the image capturing apparatus 1 according to the first embodiment described with reference to FIG. 1, descriptions thereof will be omitted.

FIG. 7 is a flowchart illustrating an example of the by-area luminance correction and image synthesis processing that the image capturing apparatus 1 according to the second embodiment executes. In addition to the processing of the first embodiment illustrated in FIG. 4, the flowchart further includes processing for adjusting the exposure between the infrared image and the visible image and processing for selecting an area to which luminance correction is to be applied.

Steps S1 and S2 in FIG. 7 are the same as steps S1 and S2 of the first embodiment in FIG. 4, in which areas are detected from the image, and an average luminance value is calculated for each area.

In step S71 next to step S2 in FIG. 7, the by-area luminance calculation unit 16 of the image capturing apparatus 1 executes exposure adjustment between the infrared image and the visible image. Specifically, the by-area luminance calculation unit 16 executes the exposure adjustment by multiplying the entire infrared image by a digital gain so that the average luminance of a given area of the infrared image becomes equal to the average luminance of the corresponding area of the visible image.

Referring to the infrared image in FIG. 2A and the visible image in FIG. 2B, area A and area B are detected in both of FIG. 2A and FIG. 2B. An area to be used as the reference for exposure adjustment may be an area having a high proportion of the entire image. The by-area luminance calculation unit 16 applies the exposure adjustment to the entire infrared image in FIG. 2A so that the average luminance values of area A in the infrared image and the visible image become the same.

An adjustment value Ze for the exposure adjustment is the same as Eq. 1 and can be expressed as Eq. 5. The area used as the reference for the exposure adjustment is hereinafter referred to as "reference area". In the following description, area A having the largest size of the image is used as the reference area.

$$Ze = Yvr\_a\_av / Yir\_a\_av \quad (Eq.\ 5)$$

The luminance is corrected by multiplying the entire infrared image of FIG. 2A by a digital gain using the adjustment value Ze for exposure adjustment in Eq. 5. The corrected luminance value Yire is expressed as Eq. 6.

$$Yire = Yir * Ze \quad (Eq.\ 6)$$

At that time, the average luminance by area of the infrared image calculated in step S2 is also multiplied by the adjustment value Ze. Therefore, the average luminance Yir_a_av of area A and the average luminance Yir_b_av of area B are expressed as Eq. 7 and Eq. 8, respectively.

$$Yire\_a\_av = Yir\_a\_av * Ze \quad (Eq.\ 7)$$

$$Yire\_b\_av = Yir\_b\_av * Ze \quad (Eq.\ 8)$$

Referring back to FIG. 7, in step S72 next to step S71, the by-area luminance calculation unit 16 selects an area to which luminance correction is to be applied from the areas detected in step S1. Specifically, the by-area luminance calculation unit 16 compares the average luminance values of the areas in the infrared image subjected to exposure adjustment and the visible image with reference to the reference area A.

If the difference between Yire_b_av and Yvr_b_av in area B is small, in other words, if the luminance difference between the infrared image and the visible image is small, application of luminance correction has small effect on bringing the luminance of the infrared image close to the luminance of the visible image, and therefore there is no need to apply the luminance correction. In contrast, if the difference between Yire_b_av and Yvr_b_av is large, in other words, if the luminance difference between the infrared image and the visible image is large, luminance correction may be applied. The comparison of the luminance difference of each area allows selecting an area to which luminance correction is to be applied. A threshold for determining whether the luminance difference is large or small may be freely set by the designer or the user.

To bring the luminance distribution of the infrared image to the luminance distribution (appearance) of the visible image, all areas with large luminance difference may be subjected to luminance correction. However, if infrared-light-band-specific information is given weight, whether to apply the luminance correction may be changed depending on the relationship in the degree of luminance difference between the infrared image and the visible image.

For example, if the luminance difference of the infrared image is large, and the luminance difference of the visible image is small, it may be determined that the amount of infrared-light-band-specific information is large, and the infrared luminance information may be output without being subjected to luminance correction. In contrast, if the luminance difference of the infrared image is small, and the luminance difference of the visible image is large, it may be determined that the amount of infrared information is small, and the infrared luminance information subjected to luminance correction may be output. In this way, an area to which luminance correction is to be applied can be selected.

In step S3 next to step S72, the by-area luminance calculation unit 16 calculates the by-area luminance correction value Xe. For area A to which exposure adjustment is applied in the present embodiment, the infrared image and the visible image are exposed at the same degree, and there is no need to apply luminance correction. For this reason, in step S3, the by-area luminance correction value Xeb for area B may be calculated.

The by-area luminance correction value Xeb for area B can be expressed as Eq. 9, like step S3 in FIG. 4, and Eq. 2.

$$Xeb = Yvr\_b\_av / Yire\_b\_av \quad (Eq.\ 9)$$

In step S4, the luminance correction unit 17 performs by-area luminance correction. Since the area to which exposure adjustment is applied is exposed at the same degree between the infrared image and the visible image, the area does not need luminance correction. For this reason, Eq. 9 expresses the by-area luminance correction value for area B. Eq. 10 and Eq. 11 expresses infrared luminance information on the corrected infrared image subjected to luminance correction.

$$Yirc = Yire * Xeb \quad (Eq.\ 10)$$

$$Yirc = Yire * Yvr\_b\_av / Yire\_b\_av = Yir * Ze * Yvr\_b\_av / (Yir\_b\_av * Ze) = Yir * Yvr\_b\_av / Yir\_b\_av \quad (Eq.\ 11)$$

In the above description, a largest area is selected as the reference area to which exposure adjustment is to be applied. This is given for mere illustrative purposes and is not intended to limit the present disclosure. For example, an area with intermediate luminance, or an area whose average luminance is closest between the visible image and the infrared image may be selected. Setting an evaluation frame for automatic exposure (AE) to the reference area in advance allows the infrared image and the visible image to be equally exposed at the time of shooting, allowing step S71 of exposure adjustment in FIG. 7 to be skipped.

In the above description, in determining the area to which luminance correction is to be applied, the luminance difference in average luminance between the infrared image and the visible image is used. This is given for mere illustrative purposes and is not intended to limit the present disclosure. For example, the determination may be made by comparing the contrasts in the area. For example, an area in which the contrast of the infrared image is higher than the contrast of the visible image may be determined to have much information in the infrared image, and therefore image synthesis processing may be executed without application of luminance correction to the area. In other words, only an area in which the contrast of the infrared image is not higher than the contrast of the visible image may be subjected to luminance correction for image synthesis processing. The determination of an area to which luminance correction is to be applied using the contrast may also be applied to a third embodiment and a fourth embodiment described later.

Thus, the image capturing apparatus according to the second embodiment executes exposure adjustment between the infrared image and the visible image before applying luminance correction to the infrared image. The image capturing apparatus selects an area in which the luminance correction is to be performed from the areas of the infrared image to apply luminance correction only to an area of the infrared image with a large luminance difference.

This increases the color reproducibility in the composite image, reducing a feeling of strangeness that the composite image gives the user, as in the first embodiment, and reduces the processing load of the luminance correction.

Third Embodiment

Referring to FIGS. 8A and 8B to FIG. 10, a third embodiment will be described in detail only with respect to differences from the first and second embodiments.

In the first embodiment, the image capturing apparatus 1 divides the image into areas and corrects the luminance so as to bring the average luminance of each area of the infrared image close to the average luminance of the visible image. In contrast, in the present embodiment, the image capturing apparatus 1 selects an area whose luminance is to be corrected when detecting the areas of the image on the basis of whether infrared-light-band-specific information has been obtained.

With different wavelength bands, like the visible light and the infrared light, the obtained visible image and the obtained infrared image can differ. An image including sunglasses will be described as an example. Some sunglasses have low transmittance for the visible light band and high transmittance for the infrared light band. If an image of such sunglasses having wavelength dependency is captured in the individual wavelength bands, the glass surface of the sunglasses is imaged because the visible light does not pass the sunglasses in the visible light band. In contrast, in the infrared light band, infrared light passes through the sunglasses, so that the eyes through the sunglasses can be imaged.

In this case, if luminance correction is applied to the infrared luminance information, the infrared luminance information on the eyes through the sunglasses obtained in the infrared light band is corrected with the average luminance of the glass surface of the sunglasses obtained in the visible light band. Thus, performing the luminance correction on different objects will diminish the infrared-light-band-specific information, making it impossible to generate a proper composite image. Furthermore, if the luminance of the surface of the sunglasses in the visible light band is extremely low, the infrared image after subjected to luminance correction is overexposed, so that infrared-light-band-specific information is lost. For that reason, if the infrared-light-band-specific information, like eyes through sunglasses, is important, the composite image may be generated without applying the luminance correction.

The hardware and the functional configuration of the image capturing apparatus 1 according to the third embodiment are similar to those of the image capturing apparatus 1 according to the first embodiment described with reference to FIG. 1, and therefore descriptions thereof will be omitted.

Figure 8A:
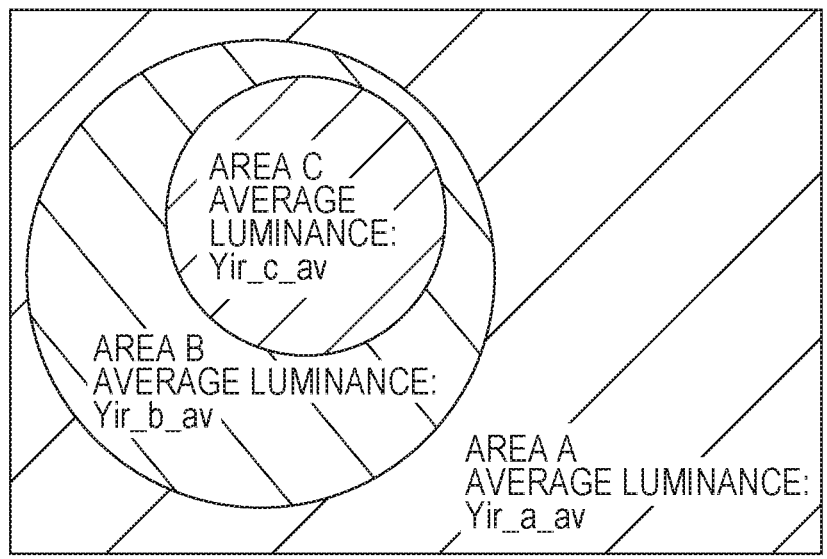
FIG. 8A is a diagram illustrating an example of the luminance of an infrared image having infrared-specific information in area C.
Figure 8B:
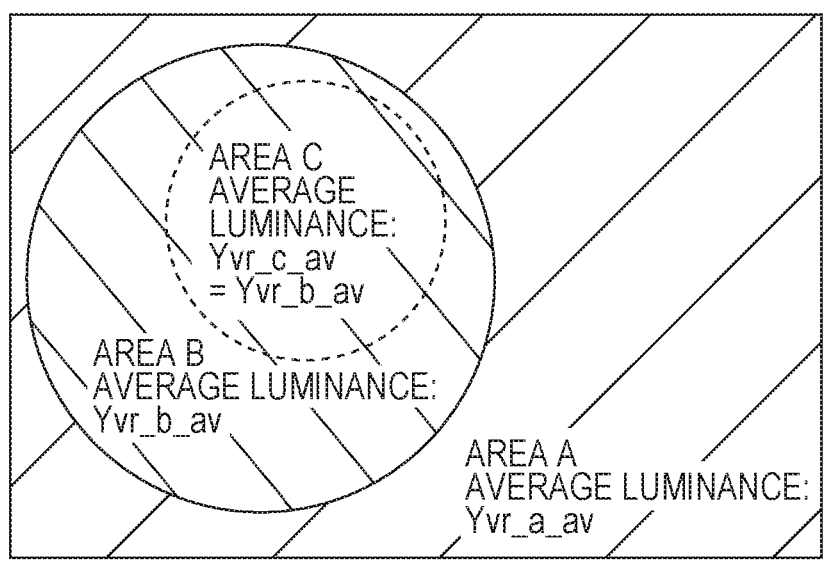
FIG. 8B is a diagram illustrating an example of the luminance of a corresponding visible image.

FIGS. 8A and 8B illustrate examples of an image in which area A, area B, and area C are captured. FIG. 8A illustrates an example of the infrared image, in which the average luminance differs obviously in all of area A, area B, area C. FIG. 8B illustrates an example of the visible image, in which there is no difference in average luminance between area B and area C, and there is an obvious difference between area A and areas B and C.

Figure 9:
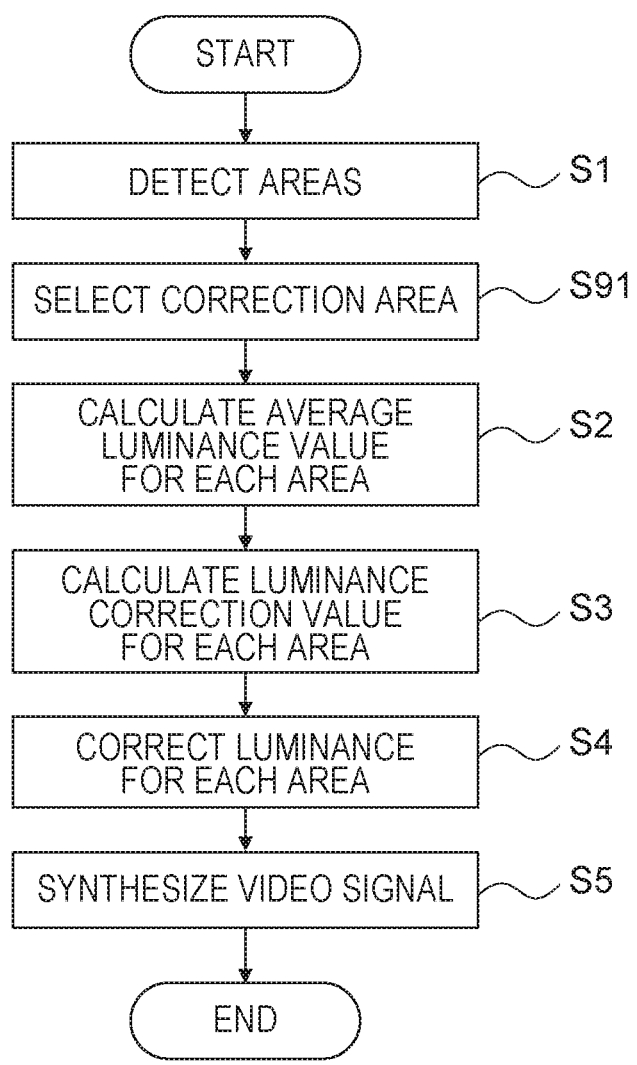
FIG. 9 is a flowchart illustrating an example of the procedure of by-area luminance correction and image synthesis processing that an image capturing apparatus according to a third embodiment executes.

FIG. 9 is a flowchart illustrating an example of the by-area luminance correction and image synthesis processing that the image capturing apparatus 1 according to the third embodiment executes. In addition to the processing of the first embodiment illustrated in FIG. 4, the flowchart further includes processing for selecting an area to which luminance correction is to be applied.

Step S1 in FIG. 9 is the same as step S1 of the first embodiment in FIG. 4, in which the by-area luminance calculation unit 16 of the image capturing apparatus 1 detects areas from the image. However, in the present embodiment, in the subsequent step S91, the by-area luminance calculation unit 16 detects areas from each of the infrared image and the visible image for comparison. The area detection is executed by detecting a level difference in luminance in the image. Thus, in the infrared image of FIG. 8A, area A, area B, and area C having a difference in luminance from the adjacent area is detected. In contrast, in the visible image of FIG. 8B, area A having a difference in luminance from the other adjacent areas B and C is detected, but area B and area C cannot be segmented. Here, area B and area C are assumed to be area B assuming that area C of the visible image is included in area B. In other words, area A and area B are detected in the visible image of FIG. 8B.

In step S91 next to step S1, the by-area luminance calculation unit 16 selects an area to which luminance correction is to be applied. In the present embodiment, of the areas detected in step S1 of FIG. 9, an area segmented into smaller parts in the infrared image than in the visible image may be determined to be an area to which luminance correction is not to be applied. In other words, luminance correction is applied only to an area detected in both of the infrared image and the visible image.

Referring to FIGS. 8A and 8B, area A is the same in size and shape between the infrared image and the visible image, and is therefore determined to be an area to be subjected to luminance correction. Area B has a shape in which the interior is cut off by area C in the infrared image of FIG. 8A, but in the visible image of FIG. 8B, has a shape having no cut-off because it cannot be separated from area C. Furthermore, area C is separated from area B in the infrared image of FIG. 8A, but in the visible image of FIG. 8B, is merged into area B and cannot be separated therefrom.

Thus, area B and area C are segmented areas in the infrared image in FIG. 8A, as compared with the areas in the visible image, and are therefore determined to be areas in which no luminance correction is to be applied. In contrast, area A is not segmented into smaller parts in the infrared image than in the visible image and is therefore selected as an area to be subjected to luminance correction.

Referring back to FIG. 9, in step S2, the by-area luminance calculation unit 16 calculates average luminance for each area. However, the by-area luminance calculation unit 16 may calculate the average luminance only for area A selected in step S91 and does not need to calculate the average luminance for the areas to which luminance correction is not to be applied (area B and area C in FIG. 8A).

In step S3 of FIG. 9, the by-area luminance calculation unit 16 calculates a luminance correction value for area A selected in step S91, as in step S3 of FIG. 4.

In step S4, the luminance correction unit 17 applies luminance correction to area A selected in step S91, as in step S4 of FIG. 4.

In step S5, the video-signal synthesizing unit 18 combines the corrected infrared luminance information Yirc on the infrared image and the chrominance difference information Cvr on the visible image to generate a composite image, as in step S5 of FIG. 4.

Figure 10:
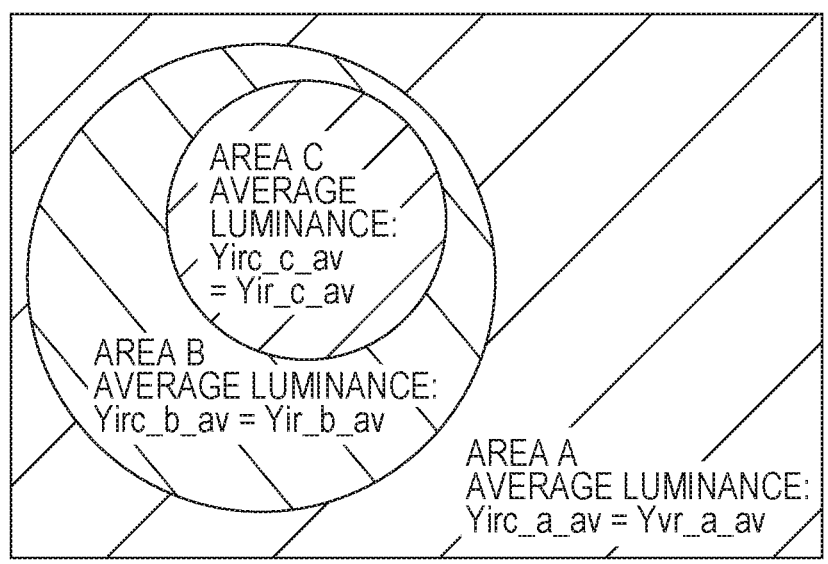
FIG. 10 is a diagram illustrating an example of the luminance of an infrared image after the infrared image in FIG. 8A is subjected to luminance correction.

FIG. 10 illustrates an example of an image obtained by selecting an area to which luminance correction is to be applied from the infrared image of FIG. 8A and executing luminance correction on the selected area in the present embodiment.

Since area A in FIG. 10 is subjected to luminance correction, the average luminance of area A agrees with the average luminance of the visible image in FIG. 8B. In contrast, area B and area C in FIG. 10 are not subjected to luminance correction. Therefore, the average luminance of area B and area C does not change and respectively agrees with the average luminance of area B and area C of the infrared image in FIG. 8A.

As described above, when detecting the areas of the image, the image capturing apparatus 1 according to the present embodiment selects an area whose luminance is to be corrected from the infrared image on the basis of whether infrared-light-band-specific information has been obtained.

This allows generating a composite image with high color reproducibility while reducing a feeling of strangeness that the composite image gives the user, as in the first embodiment, and allows applying luminance correction while keeping infrared-light-band-specific information.

Fourth Embodiment

Referring to FIGS. 11A and 11B to FIG. 13, a fourth embodiment will be described in detail only with respect to differences from the first to third embodiments.

In the third embodiment, the image capturing apparatus 1 selects an area whose luminance is to be corrected when detecting the areas of the image on the basis of whether infrared-light-band-specific information has been obtained. In contrast, in the present embodiment, the area to be subjected to luminance correction is selected on the basis of the luminance value calculated for each area in calculating the average luminance value for each area.

If luminance correction is applied to, for example, an underexposed area whose luminance is low or an overexposed area whose luminance is high is present in the visible image, corrected infrared luminance information also has underexposure or overexposure. In the case where the infrared luminance information is lost as described above, the area may not need to be subjected to luminance correction. For this reason, in the present embodiment, the area whose luminance is to be corrected is selected on the basis of the luminance value calculated for each area in calculating average luminance for each area.

The hardware and the functional configuration of the image capturing apparatus 1 according to the fourth embodiment are similar to those of the image capturing apparatus 1 according to the first embodiment described with reference to FIG. 1, and therefore descriptions thereof will be omitted.

Figure 11A:
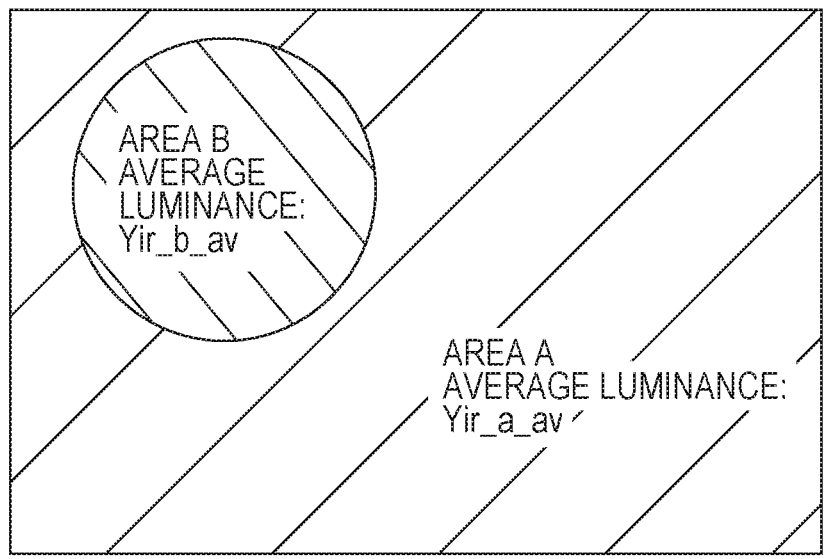
FIG. 11A is a diagram illustrating an example of the luminance of an infrared image having infrared-specific information in area B.
Figure 11B:
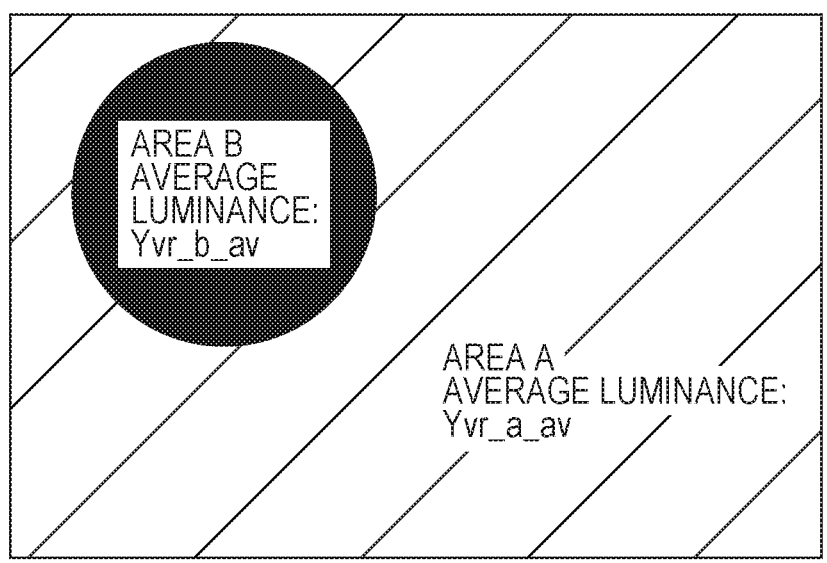
FIG. 11B is a diagram illustrating an example of the luminance of a corresponding visible image.

FIGS. 11A and 11B illustrate examples of images in which area A and area B are captured, as in FIGS. 2A and 2B. FIG. 11A illustrates an example of the infrared image, in which both of area A and area B are not underexposed and overexposed. In contrast, FIG. 11B illustrates an example of the visible image, in which area A is not underexposed and overexposed, but area B is underexposed.

Figure 12:
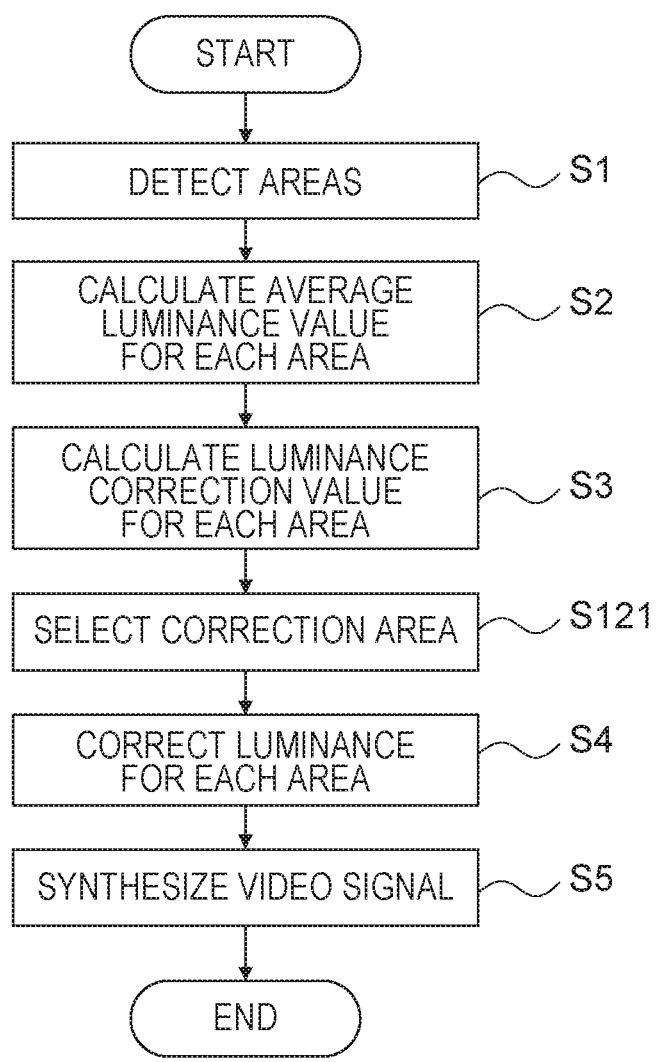
FIG. 12 is a flowchart illustrating an example of the procedure of by-area luminance correction value calculation processing and by-area luminance correction processing that an image capturing apparatus according to a fourth embodiment executes.

FIG. 12 is a flowchart illustrating an example of the procedure of by-area luminance correction value calculation processing and by-area luminance correction processing that the image capturing apparatus 1 according to the fourth embodiment executes. In addition to the processing of the first embodiment illustrated in FIG. 4, this flowchart includes processing for selecting an area to which luminance correction is to be applied after a luminance correction value is calculated for each area.

Steps S1 to S3 in FIG. 12 is the same as steps S1 to S3 of FIG. 4 in the first embodiment.

After in step S3 an average luminance value is selected for each area of the image, in step S121, the luminance correction unit 17 selects an area to which luminance correction is to be applied on the basis of the average luminance value for each area calculated in step S3.

For example, if the luminance value for each area of the visible image calculated in step S3 is extremely low or extremely high, the area is presumed to be underexposed or overexposed. In this case, if the same area in the infrared image is not underexposed or overexposed unlike the visible image, correcting the luminance information on the infrared image using the luminance information on the visible image would lose infrared-light-band-specific information. For this reason, to reflect the infrared-light-band-specific information on the composite image, such an area may not be subjected to luminance correction. In other words, the luminance correction unit 17 applies luminance correction only to an area in the infrared image corresponding to an area in the visible image whose average luminance value is within a predetermined upper limit threshold and lower limit threshold.

Referring to FIGS. 11A and 11B, area A is not underexposed and overexposed in both of the infrared image of FIG. 11A and the visible image of FIG. 11B and may therefore be subjected to luminance correction. In contrast, area B is not underexposed and overexposed in the infrared image of FIG. 11A, but is underexposed in the visible image of FIG. 11B, and may not therefore be subjected to luminance correction. In step S121 of FIG. 12, an area whose luminance is to be corrected is selected so that the luminance information on the underexposed or overexposed area of the visible image is not reflected on the composite image.

Next to step S121 of FIG. 12, the luminance correction unit 17 applies luminance correction to area A selected in step S121, as in step S4 of FIG. 4.

In step S5, the video-signal synthesizing unit 18 combines the corrected infrared luminance information Yirc on the infrared image and the chrominance difference information Cvr on the visible image to generate a composite image, as in step S5 of FIG. 4.

Figure 13:
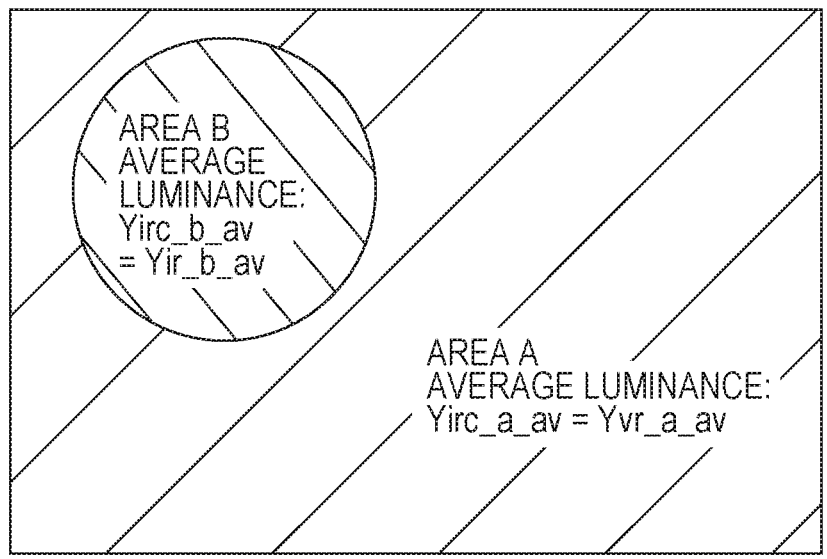
FIG. 13 is a diagram illustrating an example of the luminance of an infrared image after the infrared image in FIG. 11A is subjected to luminance correction.

FIG. 13 illustrates an example of an image obtained by selecting an area to which luminance correction is to be applied from the infrared image of FIG. 11A and applying luminance correction to the selected area in the present embodiment.

Since area A in FIG. 13 is subjected to luminance correction, the average luminance of area A agrees with the average luminance of the visible image in FIG. 11B. In contrast, area B in FIG. 13 is not selected as an area to be subjected to luminance correction and is not subjected to luminance correction. Therefore, the average luminance of area B does not change and agrees with the average luminance of area B of the infrared image in FIG. 11A.

The criterion for determination of underexposure and overexposure may be freely set by the designer or the user. For example, the threshold may be set in such a manner that a luminance of 10% or less indicates underexposure, and a luminance of 90% or more indicates overexposure, with the lower limit set to 0%, and the upper limit set to 100%.

An area that is underexposed in the infrared image and overexposed in the visible image may be subjected to luminance correction. Likewise, an area that is overexposed in the infrared image and underexposed in the visible image may be subjected to luminance correction. The area to which luminance correction is to be applied may be determined only according to whether or not the visible image is underexposed or overexposed.

As described above, the image capturing apparatus 1 according to the present embodiment selects an area whose luminance is to be corrected from the areas of the infrared image on the basis of the average luminance value calculated for each area when calculating the average luminance value.

This increases the color reproducibility in the composite image, reducing a feeling of strangeness that the composite image gives the user, as in the first embodiment, and efficiently prevents the underexposure or overexposure of the visible image to be reflected to the composite image.

Fifth Embodiment

Referring to FIGS. 14A and 14B to FIG. 16, a fifth embodiment will be described in detail only with respect to differences from the first to fourth embodiments. In the third and fourth embodiments, the image capturing apparatus 1 does not apply luminance correction to an area in the infrared image having infrared-light-band-specific information. In contrast, the present embodiment provides a user interface that displays two images, an infrared image before being subjected to luminance correction and a composite image after being subjected to luminance correction, side by side on a display unit when the infrared image includes infrared-light-band-specific information.

With a configuration similar to the third and fourth embodiments, comparing the visible image and the infrared image in detecting an area whose luminance is to be corrected allows determining whether the area includes infrared-light-band-specific information. In the present embodiment, luminance correction is applied regardless of the comparison result, but if it is determined that the area includes infrared-light-band-specific information, the infrared image before being subjected to luminance correction is displayed next to a composite image synthesized from the infrared image after being subjected to luminance correction.

Figure 14:
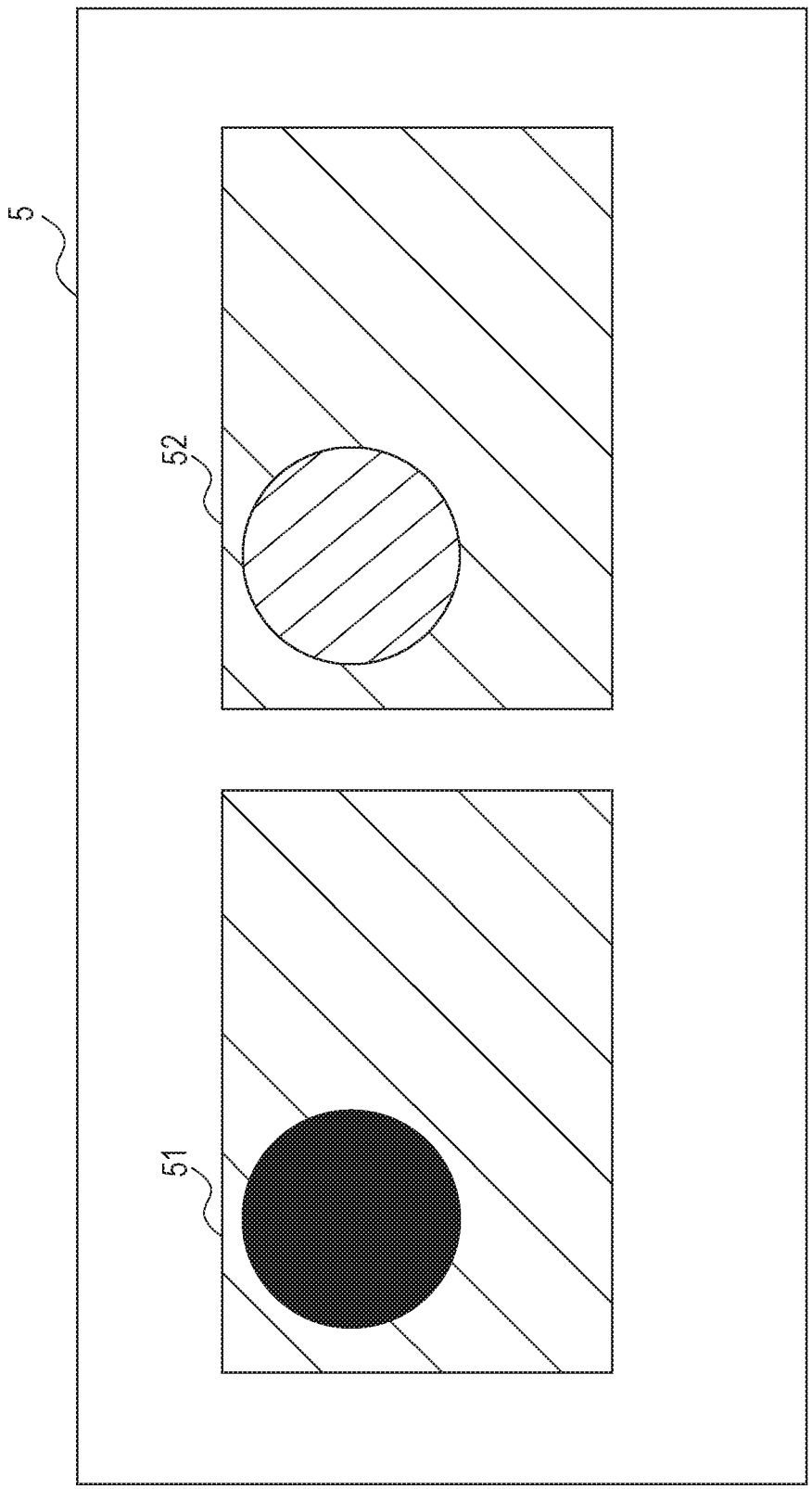
FIG. 14 is a diagram illustrating an example a parallel display of a composite image and an infrared image before being subjected to luminance correction that an image capturing apparatus according to a fifth embodiment outputs.

FIG. 14 illustrates an example in which the composite image and the infrared image before being subjected to luminance correction are displayed side by side on a display 5 on the basis of the images in FIGS. 11A and 11B in which area B includes the infrared-light-band-specific information. As illustrated in FIG. 14, the video-signal synthesizing unit 18 controls the display so that a composite image 51 subjected to luminance correction and an infrared image 52 before being subjected to luminance correction are displayed side by side on the same display 5. The image sizes may not be the same, one of which may be larger or smaller.

Since the area including the infrared-light-band-specific information is known, not the entire image but only the infrared-light-band-specific information may be extracted and displayed.

Figure 15:
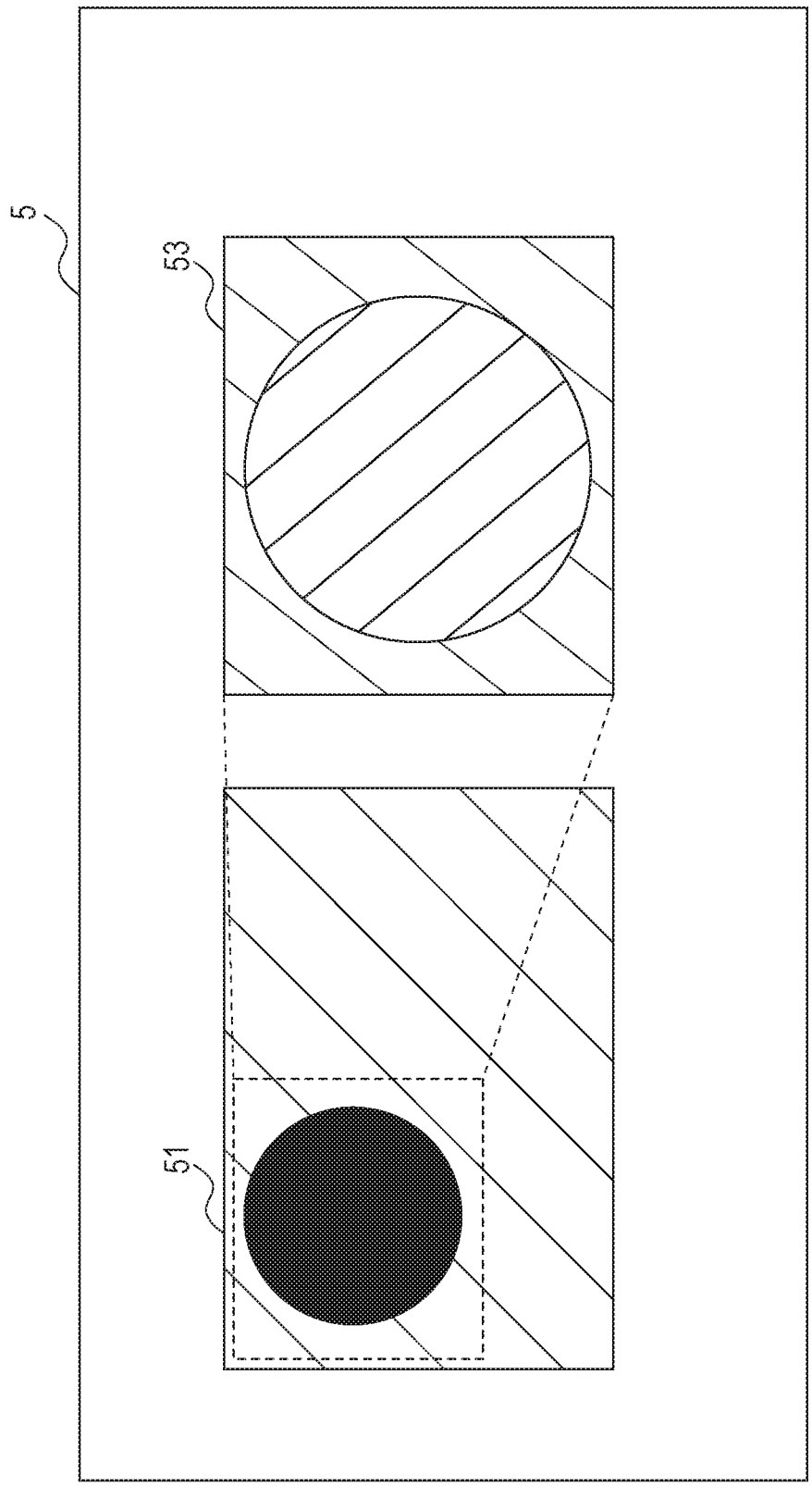
FIG. 15 is a diagram illustrating an example of a parallel display of a composite image and an extracted infrared image before being subjected to luminance correction that the image capturing apparatus according to the fifth embodiment outputs.

FIG. 15 illustrates an infrared image before being subjected to luminance correction in which infrared-light-band-specific information is extracted. FIG. 15 illustrates an example in which the composite image 51 and an infrared image 53 before being subjected to luminance correction in which infrared-light-band-specific information is extracted are displayed side by side on the display 5 on the basis of the images in FIGS. 11A and 11B in which area B includes the infrared-light-band-specific information. Controlling the display so that the images 51 and 53 are displayed side by side, and a clip frame is displayed in the composite image 51 as in FIG. 15 makes it easy to visually recognize the infrared-light-band-specific information in the image.

Alternatively, the user may be enabled to select a composite image using infrared-light-band-specific information or a composite image close to the visible image. Whether to select the area to which luminance correction in the above embodiments is to be performed may be changed according to user's selection. If the user wants infrared-light-band-specific information, area selection may be executed so that an area including infrared-light-band-specific information is not subjected to luminance correction, and if the user wants an image close to the visible image, area selection may not be executed.

Figure 16:
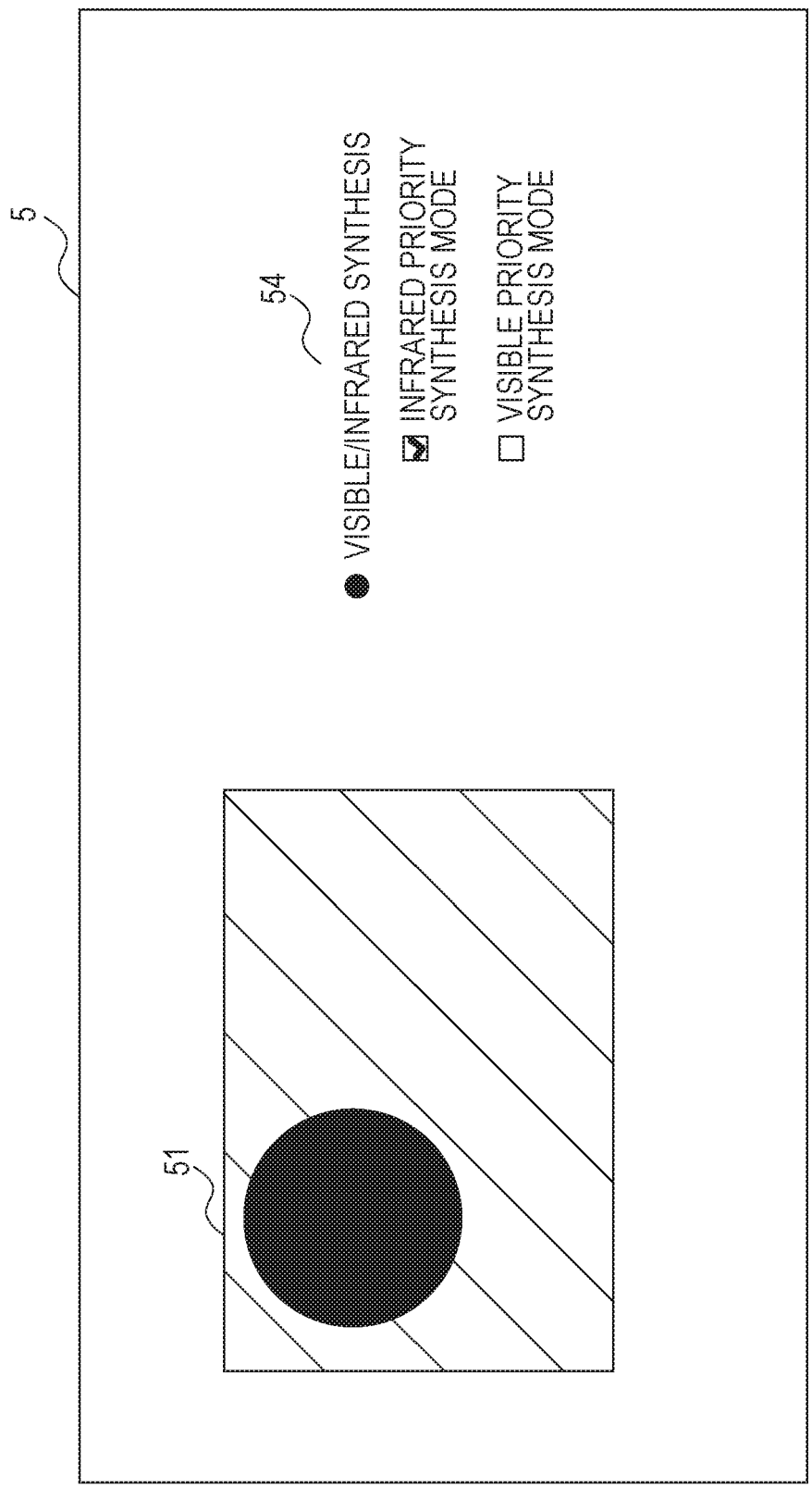
FIG. 16 is a diagram illustrating an example of a synthesis mode selection display that the image capturing apparatus according to the fifth embodiment outputs.

FIG. 16 illustrates an example of a user interface 54 for prompting the user to select a mode in which infrared specific information is given weight (an infrared priority synthesis mode) and a mode in which a visible image is given weight (a visible priority synthesis mode). As illustrated in FIG. 16, the video-signal synthesizing unit 18 prompts the user to select one of the infrared priority synthesis mode and the visible priority synthesis mode.

If in FIG. 16 the infrared priority synthesis mode is selected, selection of an area whose luminance is to be corrected is executed, and the luminance correction of any one of the second to fourth embodiments is applied. In contrast, if the visible priority synthesis mode is selected, selection of an area whose luminance is to be corrected is not executed, and the luminance correction of the first embodiment is applied. Note that the mode display in FIG. 16 is given for mere illustrative purposes and can be changed as appropriate. The display examples of FIGS. 14, 15, and 16 may be combined as appropriate.

As described above, in the present embodiment, the image capturing apparatus 1 displays the infrared image before being subjected to luminance correction and the composite image side by side or provides a user interface for prompting the user to select a desired synthesis mode. This allows generating a composite image suitable for the application that the user desires.

Figure 17:
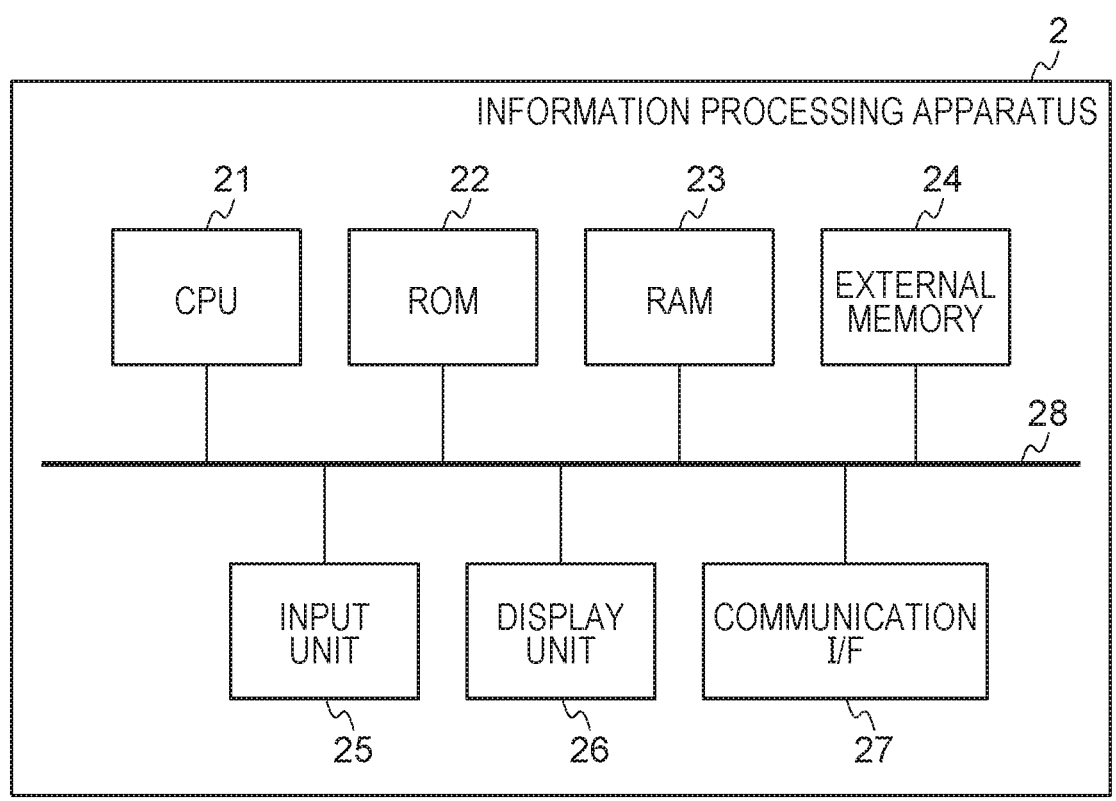
FIG. 17 is a diagram illustrating an example of the hardware configuration of the image processing apparatus according to each embodiment.

FIG. 17 is a diagram illustrating an example of the hardware configuration of an information processing apparatus that processes an image input from an image capturing apparatus or externally using the image processing of the embodiments. An information processing apparatus 2 illustrated in FIG. 17 includes a central processing unit (CPU) 21, a read only memory (ROM) 22, a random access memory (RAM) 23, an external memory 24, an input unit 25, a display unit 26, a communication interface (I/F) 27, and a system bus 28. The CPU 21 coordinates and controls the operation of the information processing apparatus 2 and controls the components 21 to 27 via the system bus 28. The ROM 22 is a non-volatile memory that stores a control program for the CPU 21 to execute the processing, and so on. The program may be stored in the external memory 24 or a detachable storage medium (not illustrated). The RAM 23 functions as a main memory and a work area of the CPU 21. In other words, the CPU 21 implements various functional operations by loading the program and so on for executing the processing from the ROM 22 into the RAM 23 and executing the program and so on.

The external memory 24 stores various pieces of data and various pieces of information for the CPU 21 to perform processing using the program. The external memory 24 also stores various pieces of data and various pieces of information obtained by the CPU 21 performing processing using the program and so on. The input unit 25 includes a keyboard and a pointing device, such as a mouse. The display unit 26 is a monitor, such as a liquid-crystal display (LCD). The communication I/F 27 is an interface that controls communication between the information processing apparatus 2 and a network camera, a server, a network access server (NAS) 4, and a cloud server 8.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-145945, filed on Aug. 8, 2019, which is hereby incorporated by reference herein in its entirety.

What is claimed is:

1. An apparatus comprising:
   at least one processor; and
   a memory coupled to the at least one processor, the memory having instructions that, when executed by the processor, performs operations as:
   an acquisition unit configured to acquire a first image captured with visible light and a second image captured with non-visible light;
   a correction unit configured to correct luminance of the second image so as to bring luminance distribution of the second image close to luminance distribution of the first image; and
   a generation unit configured to combine the second image whose luminance is corrected by the correction unit and chromaticity information of the first image to generate a composite image by combining processing,
   wherein the combining processing is performed without application of luminance correction by the correction unit when a contrast of the second image is higher than a contrast of the first image.

2. The apparatus according to claim 1, wherein the correction unit is further configured to detect a plurality of areas from the first image and the second image based on a luminance difference in the first image or the second image and calculates their respective luminance values of the detected plurality of areas.

3. The apparatus according to claim 2, wherein the correction unit is further configured to, for each of the plurality of areas, calculate a correction value from a ratio of average luminance between the first image and the second image and to correct the luminance of the second image based on the calculated correction value.

4. The apparatus according to claim 2, wherein the correction unit is further configured to correct the luminance of the second image by bringing average luminance of the second image into agreement with average luminance of the first image for each of the plurality of areas.

5. The apparatus according to claim 2, wherein the correction unit is further configured to adjust exposure to acquire the second image so as to bring average luminance of a predetermined area of the second image into agreement with average luminance of a same area as the predetermined area of the first image and to correct the luminance of the exposure-adjusted second image.

6. The apparatus according to claim 5, wherein the correction unit is further configured to set a largest area of the plurality of areas as the predetermined area.

7. The apparatus according to claim 5, wherein the correction unit is further configured to set, out of the plurality of areas, an area in which an automatic exposure (AE) evaluation frame is set as the predetermined area.

8. The apparatus according to claim 2, further comprising:
   a selection unit configured to select, out of the plurality of areas, an area in which a luminance difference between the first image and the second image is larger than a predetermined threshold as an area whose luminance is to be corrected in the second image.

9. The apparatus according to claim 2, further comprising:
   a selection unit configured to select, out of the plurality of areas, an area in which contrast of the second image is lower than contrast of the first image as an area whose luminance is to be corrected in the second image.

10. The apparatus according to claim 2, further comprising:
    a selection unit configured to select, out of the plurality of areas, an area detected in both of the first image and the second image as an area whose luminance is to be corrected in the second image.

11. The apparatus according to claim 2, further comprising:
    a selection unit configured to select, out of the plurality of areas, an area of the second image corresponding an area whose average luminance is within a predetermined threshold in the first image as an area whose luminance is to be corrected in the second image.

12. The apparatus according to claim 1, further comprising:
    a display control unit configured to display the generated composite image and at least part of the second image before being subjected to luminance correction by the correction unit on a display unit.

13. The apparatus according to claim 1, further comprising:
    an input control unit configured to prompt for inputting an instruction indicating which of a luminance value of the first image and a luminance value of the second image is to be used to generate the composite image.

14. A method for controlling an apparatus, the method comprising:
  acquiring a first image captured with visible light and a second image captured with non-visible light;
  correcting luminance of the second image so as to bring luminance distribution of the second image close to luminance distribution of the first image; and
  combining the second image whose luminance is corrected and chromaticity information of the first image to generate a composite image by combining processing,
  wherein the combining processing is performed without application of luminance correction by the correction unit when a contrast of the second image is higher than a contrast of the first image.

15. The method of control according to claim 14, wherein the correcting detects a plurality of areas from the first image and the second image based on a luminance difference in the first image or the second image and calculates their respective luminance values of the detected plurality of areas.

16. The method of control according to claim 15, wherein the correcting, for each of the plurality of areas, calculates a correction value from a ratio of average luminance between the first image and the second image and corrects the luminance of the second image based on the calculated correction value.

17. The method of control according to claim 15, wherein the correcting corrects the luminance of the second image by bringing average luminance of the second image into agreement with average luminance of the first image for each of the plurality of areas.

18. A non-transitory computer-readable medium storing a program for causing a computer to execute a method of an apparatus comprising:
  acquiring a first image captured with visible light and a second image captured with non-visible light;
  correcting luminance of the second image so as to bring luminance distribution of the second image close to luminance distribution of the first image; and
  combining the second image whose luminance is corrected and chromaticity information of the first image to generate a composite image by combining processing,
  wherein the combining processing is performed without application of luminance correction by the correction unit when a contrast of the second image is higher than a contrast of the first image.

19. The non-transitory computer-readable medium according to claim 18, wherein the correcting detects a plurality of areas from the first image and the second image based on a luminance difference in the first image or the second image and calculates their respective luminance values of the detected plurality of areas.

20. The non-transitory computer-readable medium according to claim 19, wherein the correcting, for each of the plurality of areas, calculates a correction value from a ratio of average luminance between the first image and the second image and corrects the luminance of the second image based on the calculated correction value.

21. The non-transitory computer-readable medium according to claim 19, wherein the correcting corrects the luminance of the second image by bringing average luminance of the second image into agreement with average luminance of the first image for each of the plurality of areas.

* * * * *